United States Patent [19]
Chhabra et al.

[11] Patent Number: 5,923,782
[45] Date of Patent: *Jul. 13, 1999

[54] SYSTEM FOR DETECTING AND IDENTIFYING SUBSTANTIALLY LINEAR HORIZONTAL AND VERTICAL LINES OF ENGINEERING DRAWINGS

[75] Inventors: Atul K. Chhabra, White Plains, N.Y.; Vishal Misra, Amherst, Mass.; Surekha Surya, Dallas, Tex.

[73] Assignee: NYNEX Science & Technology, Inc., White Plains, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/691,116

[22] Filed: Aug. 1, 1996

[51] Int. Cl.[6] .............................. G06K 9/34; G06K 9/36; G06K 9/40; G06K 9/46
[52] U.S. Cl. .................... 382/202; 382/173; 382/199; 382/245; 382/254; 382/276; 382/282
[58] Field of Search ..................................... 382/159, 192, 382/199, 227, 253, 276, 173, 245, 254, 178, 202, 282

[56] References Cited

U.S. PATENT DOCUMENTS

| | | | |
|---|---|---|---|
| 3,069,654 | 12/1962 | Hough | 340/146.3 |
| 4,821,336 | 4/1989 | Roye | 382/245 |
| 4,849,911 | 7/1989 | Campian | 345/441 |
| 5,572,602 | 11/1996 | Naoi et al. | 382/178 |
| 5,636,297 | 6/1997 | Eller et al. | 382/293 |
| 5,680,471 | 10/1997 | Kanebako et al. | 382/128 |

OTHER PUBLICATIONS

Manesh, et al "Automatic Vectorization of Scanned Engineering Drawings," IEEE, pp. 320–324, Sep. 1990.
Arias, et al "Efficient Techniques for Telephone Company Line Drawing Interpretation," IEEE, Sep. 1995.
Arias, et al "Information Extraction From Telephone Company Drawings," IEEE, 1994.
"A Benchmark: Performance Evaluation of Dashed–Line Detection Algoritum", by Kong et al.,First Int. Workshop Aug. 10–11, 1995.
"Detection of Horizontal lines in Noisy Run Length Encoded Images," by Chhabra et al, Aug. 10–11, 1995.
"Orthogonal Zig–Zag: An Efficient Method for Extracting Straight Lines From Engineering Drawings" by I.Chai & D.Dori, *Visual Form: Analysis and Recognition*, pp. 127–136.
"Sparse–pixel Recognition of Primitives in Engineering Drawings"by D.Dori, Y.Liang, J.Dowell, and I.Chai, Machine Vision and Applications, pp. 69–82.
"Fast Detection of Horizontal Lines in Telephone Company Drawings" by A.K. Chhabra, S. Surya and V. Misra, First International Workshop on Graphics Recognition.
"Detection of Horizontal Lines in Noisy Run Length Encoded Images: The Fast Method" by A. Chhabra, V. Misra and Juan Arias, *Graphics Recognition: Method & Applications*, pp. 35–48.

*Primary Examiner*—Bipin H. Shalwala
*Assistant Examiner*—Daniel G. Mariam
*Attorney, Agent, or Firm*—Ohlandt, Greeley, Ruggiero & Perle

[57] ABSTRACT

There is provided a method for detecting horizontal and vertical lines of an encoded run length image to identify cells of the image that are formed by the lines. Initially, the method comprises the steps of filtering excess details, such as text, from the image and grouping a portion of the image for analysis. A top profile of the image is generated and, then, points along the top profile are determined where substantial changes in the profile position occur. A horizontal section of the top profile which corresponds to a line completely visible from the top is then extracted from between the points. By repeating the above steps, each horizontal line of the image is detected and extracted from the image. In addition, in order to detect the vertical lines of the image, the image is simply rotated 90° and processed with the vertical lines being positioned horizontally. By identifying the horizontal and vertical lines of the image, the cells of the original image may be identified, and the contents of each cell may be processed by optical character recognition techniques and the like.

24 Claims, 7 Drawing Sheets

SYSTEM FOR DETECTING AND IDENTIFYING SUBSTANTIALLY LINEAR HORIZONTAL AND VERTICAL LINES OF ENGINEERING DRAWINGS

The present invention relates generally to graphics interpretation systems for detecting substantially linear lines in run length encoded images. More particularly, the present invention relates to a method that is executed by such systems for identifying horizontal and vertical lines in run length encoded engineering drawings.

BACKGROUND OF THE INVENTION

Engineering drawings are often scanned into computer systems and stored in electronic form in order to more easily manage such drawings. Many of these drawings have a tabular or quasi-tabular structure in which horizontal and vertical lines form rectangular tabular cells. Examples of such structured drawings include telephone company drawings, such as assignment drawings, wiring lists, front equipment drawings and distributing frame drawings. Due to the large size of the drawings, scanned images are often encoded, specifically using run length encoding or enhancements such as the TIFF group 4 format, to reduce the amount of memory required to store the images.

Once the structured drawings are scanned into the computer system, their scanned images are analyzed and processed to convert them into computer aided design ("CAD") and data representation, a form that is easy to manipulate and query on computers. Typically, the lines of a scanned image are initially detected by the computer system. Then, the cells of the drawings are identified based on the positions of these lines, and the text contained in each cell is identified using optical character recognition ("OCR") techniques. Thus, the result is a vector and computer data representation of the information contained in the original drawings.

The operation of scanning these structured drawings causes distortions in the scanned images, such as global skew, speckles, very dark and/or faint scanning. Traditionally, structured drawings, particularly telephone company drawings, have been drafted on large sheets of Mylar. Due to the large size of the Mylar drawings, the drawings can become misaligned as they are fed through the scanner which can cause the horizontal and vertical lines of the drawings to appear skewed. Although simple realignment processes are known, such processes are not able to compensate for the skew effect, due to the fact that the drawings often have uneven and warped surfaces that further distort the lines. Over the years, Mylar sheets have been subjected to wear and tear by being processed through copying, drafting, filming, and scanning equipment. The ink of the drawings tends to detach from the Mylar sheets over time due to the wear and tear and, thus, results in fragmented lines in the drawings. In most cases, this wear and tear has caused extensive local warping, shearing effects and other distortions to develop in the Mylar sheets, which are carried over to the scanned image.

The process of eliminating the skew from structured drawings is difficult and time consuming. Due to the difficulties in compensating for the skew effect, a highly accurate line detection technique is required. In addition, large structured drawings, particularly engineering drawings, cause the process of correcting the skew to be intolerably lengthy. Such engineering drawings may be, for example, about 3 feet by 4 feet in size and, at 300 dots per inch and one byte per pixel, about 155 MBytes in size.

The cells of a structured drawing do not necessarily conform to standard layouts. In fact, the vast majority of engineering drawings have unique layouts in which the number of columns and rows vary, cells are subdivided and/or cells are merged with other adjacent cells. Thus, unlike simple forms processing, identification of cells cannot be accomplished by simply extracting data to a standard layout. Each structured drawing must be processed and interpreted without presumptions about its structure or layout.

Traditional straight line detection algorithms, such as vectorization by thinning, polygonal approximation and the Hough transform, do not work well on the distorted scanned images of structured drawings. For example, U.S. Pat. No. 3,069,654 to P.V.C. Hough, which issued on Dec. 18, 1962, entitled METHOD AND MEANS FOR RECOGNIZING COMPLEX PATTERNS, provides a Hough transform method for analyzing straight line segments of an image and transforming each line segment into a transform plane. In particular, each point along an individual line segment is transcribed as a separate line in the transform plane. By carefullly positioning the lines of the transform plane and determining the intersection point of the lines, slope and intercept data for each line segment may be stored and later analyzed for the presence of desired patterns. However, the Hough transform method cannot tolerate significant warping and skew contained within scanned images of drawings. In addition, this method is computationally expensive and slow when applied to large images, such as those for engineering drawings.

In contrast to the traditional straight line detection algorithms described above, faster and more convenient methods for detecting substantially horizontal and vertical lines are known. However, such methods still require substantial processing time and make numerous mistakes when analyzing skewed or noisy images. In particular, a sparse pixel based method for line finding called Orthogonal Zig Zag ("OZZ") is described in articles entitled "Orthogonal Zig-Zag: An Efficient Method for Extracting Bars in Engineering Drawings" by I. Chai and D. Dori, *Visual Form: Analysis and Recognition*, edited by C. Arcelli, L. Cordella and G. Sanniti di Baja (Plenum Press, New York, 1992) pp. 127–136 and "Sparse-pixel Recognition of Primitives in Engineering Drawings" by D. Dori, Y. Liang, J. Dowell, and I. Chai, Machine Vision and Applications (1993) 6:69–82. The OZZ method first finds horizontal and vertical lines using OZZ movements and then identifies slanted or angled lines. This is the fastest bitmap based method that has been encountered. Although faster than traditional straight line detection algorithms, the OZZ method still requires considerable time and memory to process large engineering drawings. In addition, the OZZ method requires a user to specify numerous adjustment parameters for effective processing of a given image type. The performance of the OZZ algorithm is sensitive to the setting of these parameters.

In addition, structured drawings are often scanned and stored in run length encoded format. Since most skew correction methods, such as the prior art methods described above, are designed to work with unencoded or bitmapped drawings, encoded drawings must be converted to unencoded form before being processed, thus requiring more memory and processing time.

SUMMARY OF THE INVENTION

Against the foregoing background, it is a primary object of the present invention to provide a fast and accurate method for identifying horizontal and vertical lines in run length encoded drawings.

It is another object of the present invention to provide such a method that is capable of dealing with severely warped, skewed and distorted lines, overlap between the text and lines, and fragmented lines.

It is a further object of the present invention to provide such a method in which the scanned image of the drawings does not require conversion to unencoded or bitmapped form in order to process the image.

It is a still further object of the present invention to provide such a method in which each line is extracted, one at a time, until all lines of the scanned image are identified.

Accordingly, the present invention is a fast and accurate system for detecting horizontal and vertical lines in the structured drawings. Thereafter, conventional methods may be used to identify the cells formed by the lines and to recognize the text contained in these cells. In particular, the present invention is a method for detecting horizontal lines in images that are in run length encoded format. Then, vertical lines may be detected by rotating the image 90 degrees and detecting the vertical lines with the same process used to detect the horizontal lines. Thus, the present invention is capable of correcting problems with skewed lines caused by uneven and warped drawing surfaces and/or misaligned scanning of the image, while maintaining the image in the run length encoded form.

To accomplish the foregoing objects and advantages, the present invention is a method for detecting a substantially linear line of an encoded run length image which, in brief summary, comprises the steps of generating a profile of the image, determining points along the profile where a change in profile position exceeds a predetermined threshold value, and extracting a section of the profile between the points. The method also includes filtering the run length image before the step of generating the profile of the image, and identifying from amongst these transition points the end points of a line that is completely visible from the top so that the line may be extracted.

More specifically, the present invention is a method for detecting horizontal and vertical lines of an encoded run length image so that these lines may be used to identify cells formed in the image. The contents of the cells may then be processed by character recognition techniques and the like. The image includes a plurality of consecutive scan lines and a plurality of run lengths distributed throughout the scan lines. In particular, the image is initially filtered to eliminate small runs that are not likely to belong to a horizontal line. A portion of the image is then grouped together in which the number of consecutive scan lines containing no run lengths is less than a predetermined vertical threshold value. A profile of the portion is then generated. Thereafter, points are determined along the profile where a change in profile position exceeds a predetermined threshold value, and a section of the profile between the points is then extracted.

In addition, for detecting all horizontal and vertical lines in an entire image, the generating step, the determining step and the extracting step are repeated until all horizontal scan lines of the image are processed. The grouping step is also repeated for processing the horizontal scan lines. Next, the original (unfiltered) image is rotated so that vertical lines of the image are oriented in a horizontal direction. Thereafter, the generating step, the determining step and the extracting step are repeated until all vertical scan lines of the image are processed.

BRIEF DESCRIPTION OF THE DRAWINGS

The foregoing and still further objects and advantages of the present invention will be more apparent from the following detailed explanation of the preferred embodiments of the invention in connection with the accompanying drawings.

DETAILED DESCRIPTION OF THE PREFERRED EMBODIMENT

The present invention is directed to a method for detecting horizontal and vertical lines of a run length encoded image. This detection method is the first phase in processing and interpreting structured drawings, specifically tabular and quasi-tabular drawings. For the second phase, a table structure representation is formed by identifying the tabular cells of the drawing based on the positions of the detected lines. Then, for the third and final phase, the textual elements within the cells are interpreted using optical character recognition ("OCR") techniques. As a result of processing and interpreting the structured drawing, skewed and distorted lines are correctly identified and text within the lines is interpreted. Although line detection is generally used in processing and interpreting structured drawings, it is contemplated that the detection method of the present invention may be used for a wide variety of applications dealing with image interpretation and processing and is not restricted to merely processing of structured drawings for cell identification and text recognition. For example, the present invention may be used for form processing and general engineering drawing interpretation.

Figure 1:
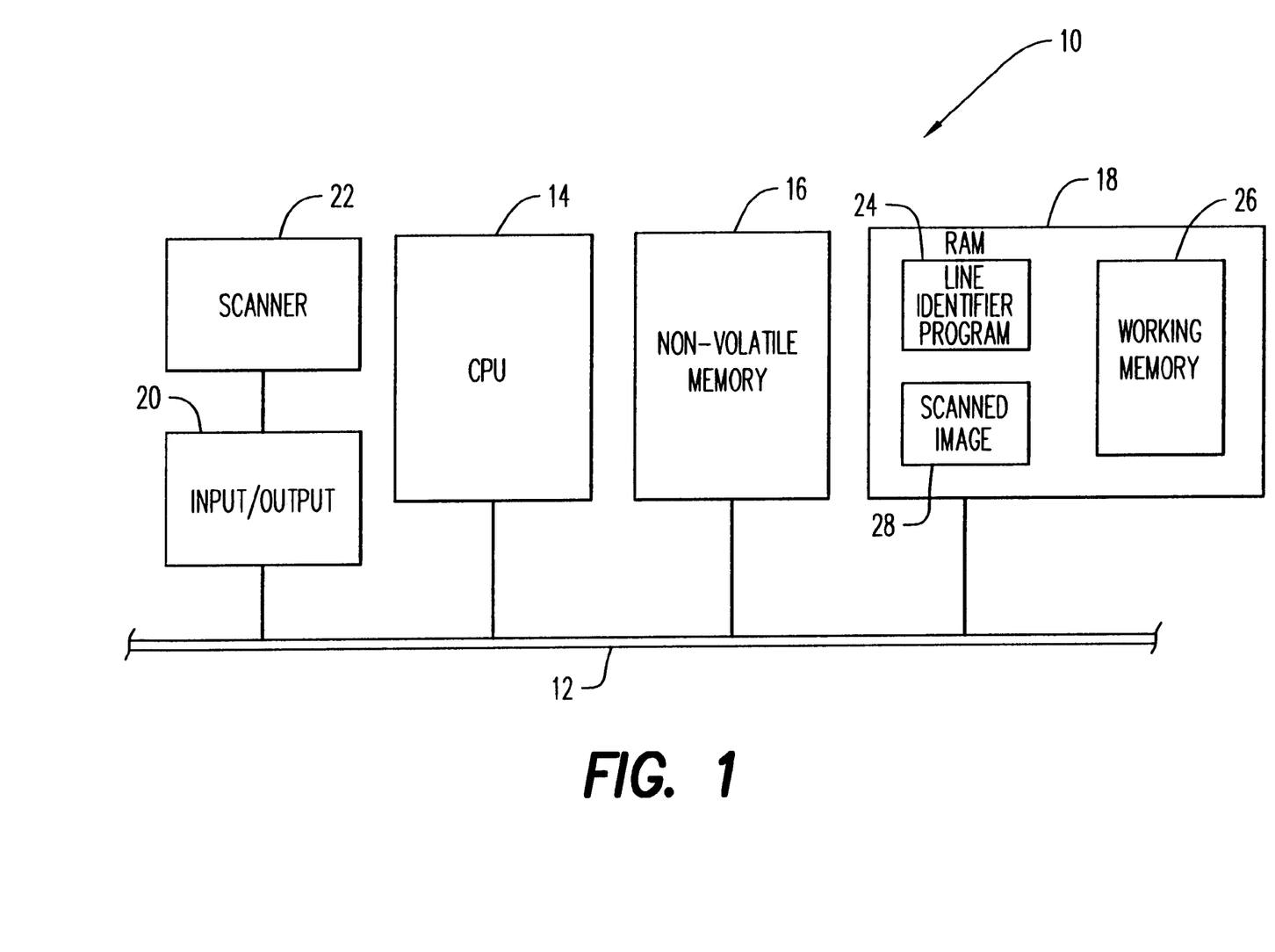
FIG. 1 is a block diagram of a preferred system in accordance with the present invention.

Referring to the drawings and, in particular, to FIG. 1, a graphics interpretation system in accordance with the present invention is generally represented by reference numeral 10. The system comprises a communication bus 12 for transferring data and address information among a central processing unit ("CPU") 14, non-volatile memory 16 such as read-only memory or disk drive, random access memory ("RAM") 18, and an input/output interface 20 that is connected to a scanner 22. For the preferred embodiment, the CPU 14, non-volatile memory 16, RAM 18 and input/output interface 20 are components of a computer workstation that is connected to the scanner 22 and has the ability to scan documents and drawings.

As shown in FIG. 1, the RAM 18 stores at least three types of information, namely a line identifier program 24, working memory 26 and a scanned image 28. The line identifier program 24 includes the sequential instructions or steps to be executed by the CPU 14 in accordance with the method of the present invention which is described below in reference to FIGS. 4A through 4D. The working memory 26 is used by the line identifier program 24 to store modified images and their representations at various stages of the processing of the scanned image 28. In addition, the scanner 22 is used to scan a particular structured diagram and generate a scanned image 28 that is stored in the RAM 18. Specifically, the scanned image 28 is transferred to the RAM 18 through the input/output interface 20 and communication bus 12.

Figure 2A:
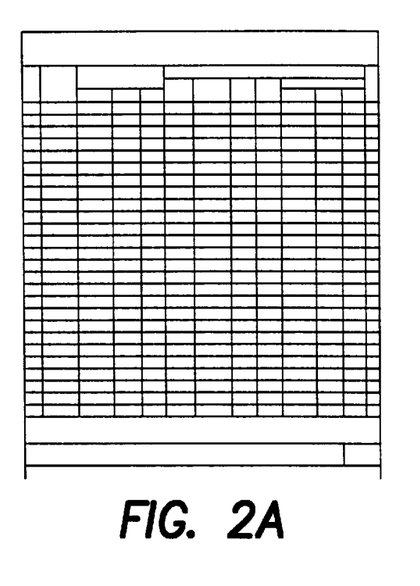
FIGS. 2A and 2B are sample structured drawings that may be scanned by the scanner of FIG. 1.
Figure 2B:
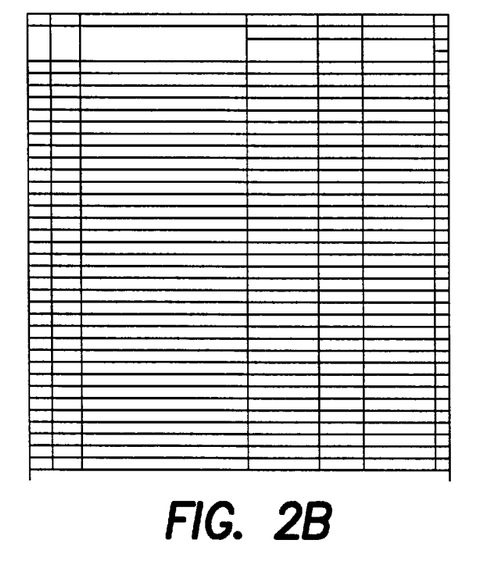

Referring to FIGS. 2A and 2B, examples are shown of the structured drawings that may be processed by the invention which include a plurality of lines directed generally in horizontal and vertical directions. Specifically, FIG. 2A is an example of an assignment drawing, and FIG. 2B is an example of a wiring list drawing. For both drawings, the generally horizontal and vertical lines form a plurality of rectangular cells in which several of the cells contain alpha-numeric text.

Figure 3:
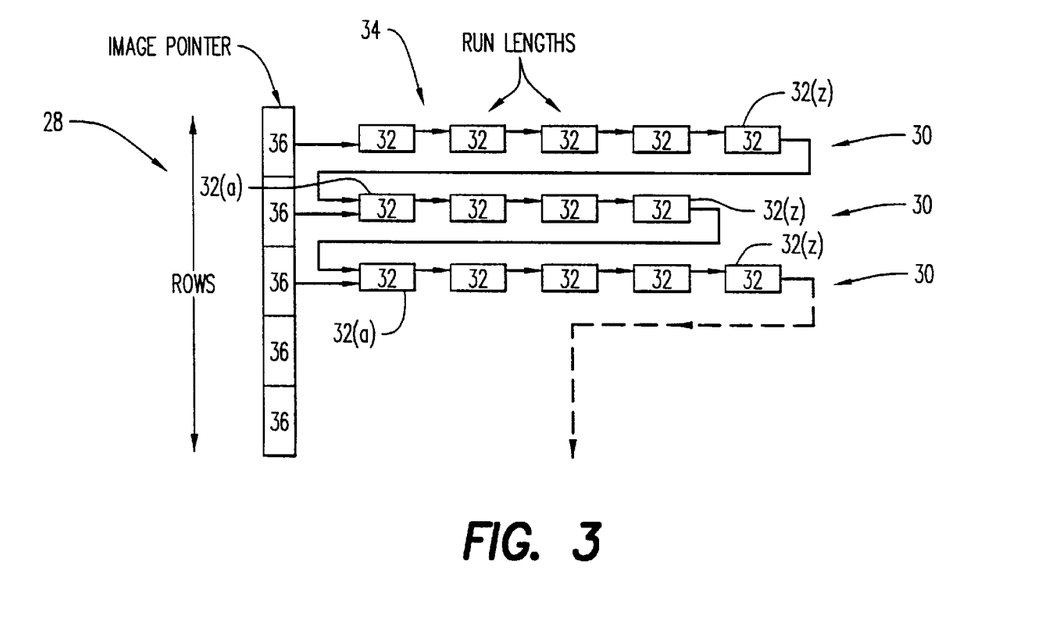
FIG. 3 is a linked list representation of all run lengths in the scanned image stored in the RAM of FIG. 1.

Referring to FIGS. 1 and 3, the scanned image 28 is stored in encoded form since, as stated above, the preferred method works directly with encoded images. For example, the preferred embodiment stores scanned images in a linked list of run lengths in which each run length includes the starting and ending coordinates of the run of "on" pixels, and a pointer to the next run length. The scanned image 28 comprises a plurality of scan lines or rows 30, in which each scan line has zero or more run lengths 32. The run lengths 32 are linked together in the form of a linked list 34 so that each run length points to the next run length of its respective scan line 30. In addition, the last run length 32(z) of each scan line is linked to the first run length 32(a) of the next scan line having a run length. Thus, this linked list 34 represents a string of run lengths 32 that forms the scanned image 28. In addition to the linked list 34, the scanned image 28 comprises a one-dimensional array of pointers 36 in which each pointer refers to the first run length 32(a), if present, of a particular scan line 30. Accordingly, the scanned image 28 represents all run lengths 32 and provides quick access to run lengths in any particular scan line 30.

Referring to FIGS. 4A through 4D, the preferred method of the present invention comprises the steps of filtering the run length image, generating a profile of the first group of run lengths of the scanned image, identifying the ends of an uppermost line using the profile, and extracting the uppermost line from the scanned image. The filtering step eliminates runs than are not likely to belong in a horizontal line, and to reduce possible fragmentation of horizontal lines in the original image. The above steps are repeated until all horizontal scan lines of the image are processed. Thereafter, the image is rotated 90° about an axis perpendicular to the page so that vertical lines of the image may be processed in the same manner.

Figure 4A:
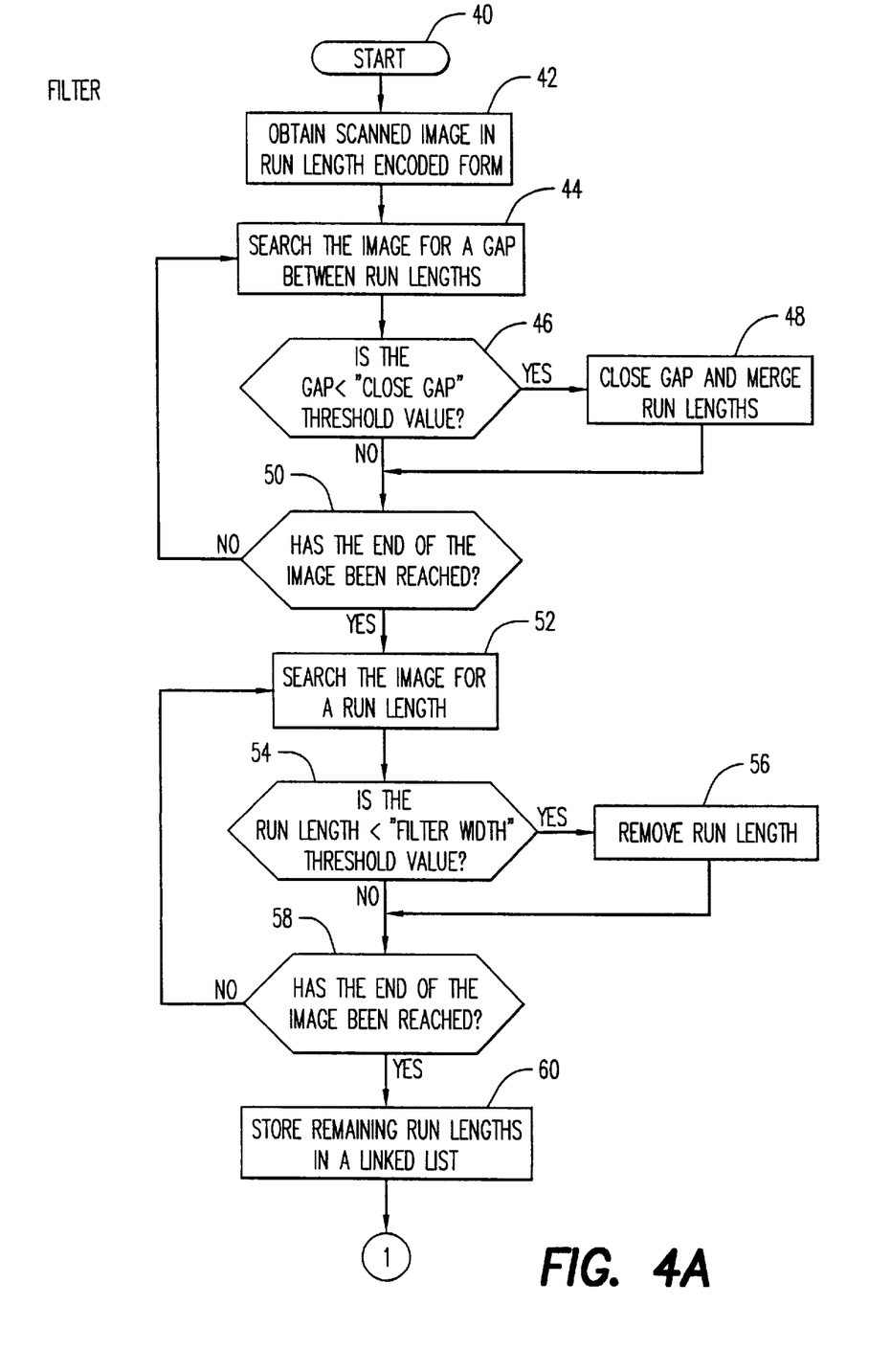
FIGS. 4A through 4D are flow diagrams of a preferred method in accordance with the present invention.

Referring to FIGS. 1 and 4A, the preferred method starts at step 40 by initiating the CPU 14 to execute the line identifier program 24 stored in the RAM 18. Optionally, as represented by step 42, the CPU 14 may perform the acts necessary to scan the structured diagram at the scanner 22 and/or transfer the scanned image 28 to the RAM 18. Conventional methods may be used to accomplish this task, or the scanned image 28 may be placed in the RAM 18 prior to executing the line identifier program 24.

The scanned image may be filtered to correct portions where ink has become detached from the structured diagram or could not be detected by the scanner. During this filtering step, run lengths with small breaks between them are connected or merged together. The scanned image is searched for gaps between run lengths that are less than a predetermined gap value or "CloseGap" threshold value and the separate run lengths are merged together. The scanned image is searched for a gap between run lengths as shown in step 44, and the gap is compared to a predetermined "CloseGap" threshold value as shown in step 46. As shown in step 48, if the gap is less than the "CloseGap" threshold value, the gap is filled-in so that the run lengths are merged. As shown in step 50, the above steps for closing gaps are repeated until all gaps of the scanned image have been searched and processed. The predetermined "CloseGap" threshold value is proportional to the scanning resolution. For example, the predetermined "CloseGap" threshold value may be set to 4 to 5 pixels for a 300 dpi image.

In addition, the scanned image may be filtered to eliminate extraneous information, particularly textual elements, non-horizontal lines and noise. This filtering step serves to eliminate all text, vertical lines and excessively skewed horizontal lines. This is accomplished by removing all run lengths that are not longer than the longest horizontal line that can be formed by the text. For example, if the longest horizontal line is the upper line of a capital "E" and if the upper line is ten pixels long, then all text of the scanned image may be eliminated by removing all horizontal lines that are not longer than ten pixels.

For the filtering step, the scanned image is searched for run lengths that are less than a predetermined run length value or "FilterWidth" threshold value, and such run lengths are removed from the image. The scanned image is searched for a run length, and the run length is compared to a predetermined "FilterWidth" threshold value as shown in steps 52 and 54. The run length is removed if its length is less than the "FilterWidth" threshold value as shown in step 56. As shown in step 58, the above steps for eliminating extraneous information are repeated until all run lengths of the scanned image have been searched and processed. Thereafter, the remaining run lengths are stored in a linked list as shown in step 60. For the preferred embodiment, the predetermined "FilterWidth" value is about 2 to 3 times the width of the largest font in the drawings.

Figure 5:
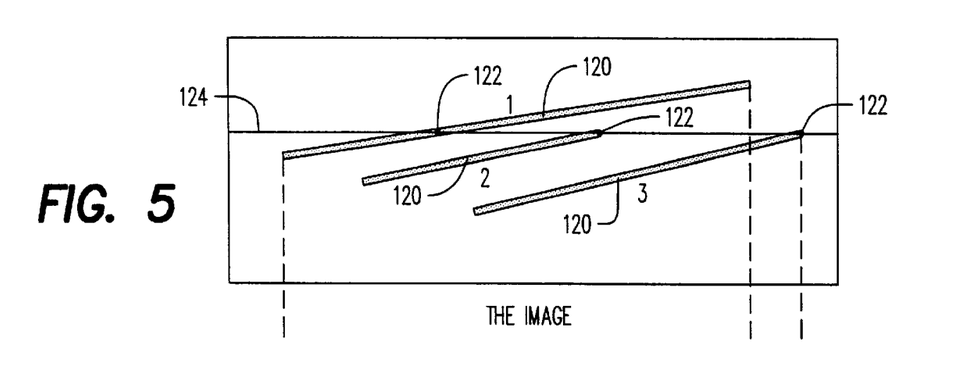
FIG. 5 shows a group of scanned lines that may be processed by the preferred system and method of FIG. 1 and FIGS. 4A through 4D, respectively.

Referring to FIG. 5, a group of run lengths may be assembled and isolated from the rest of the run lengths of the scanned image. Each run length of the scanned image has a vertical Y-coordinate value. By comparing the vertical Y-coordinate values of successive run lengths, one can determine the vertical spacing between the run lengths. If the vertical spacing is greater than a predetermined vertical gap threshold value, then the vertical spacing is identified as a vertical gap. Thus, all run lengths that exist between the beginning of the scanned image and the first vertical gap may be grouped together. Likewise, run lengths between two vertical gaps or between a vertical gap and the end of the scanned image may be grouped together as well. For example, the three lines 120 shown in FIG. 5 each have a point 122 that crosses horizontal line 124 and, therefore, vertical gaps do not exist between these lines but do exist before and after these lines.

Figure 4B:
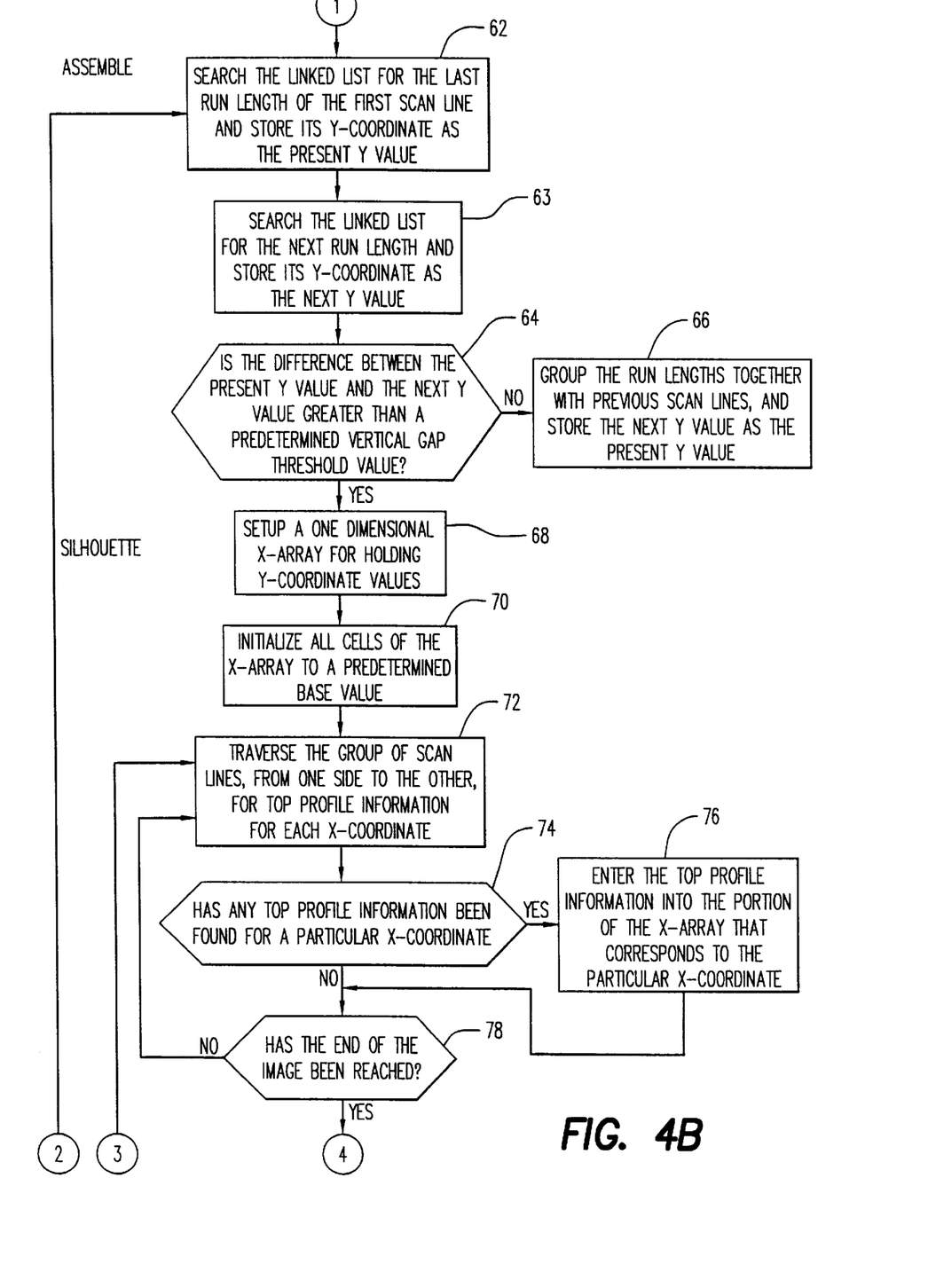

Referring to FIG. 4B, the preferred method assembles all run lengths that exist before a vertical gap into a single group. In particular, the scanned image, in the form of a linked list, is searched for the last run length of the first scan line and the Y-coordinate of that run length is stored as a present Y value as shown in step 62. The scanned image is then searched for the first run length of the next scan line and the Y-coordinate of that run length is stored as a next Y value as shown in step 63. Then, the present Y value is compared to the next Y value as shown in step 64. So long as the difference between these values is no greater than a predetermined vertical gap threshold value, the run lengths are grouped together with all previous run lengths in the group as shown in steps 64 and 66. Accordingly, scan lines are added to the group until a vertical gap is discovered.

Figure 6:
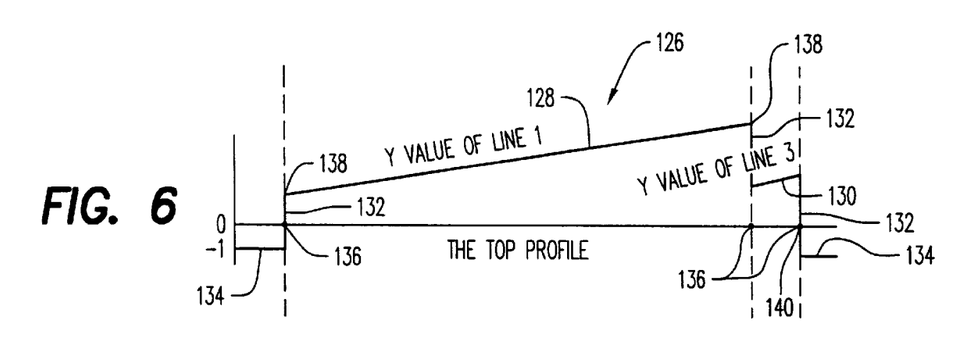
FIG. 6 is a graphic representation of a top profile of the horizontal lines of FIG. 5.

Referring to FIG. 6, the next step is to find the top profile 126 of the grouped run lengths. The top profile 126 includes all run lengths of the group that are visible from above and are not occluded by other run lengths. As shown in FIG. 6, the top profile 126 is a continuous line that corresponds to the uppermost vertical position or Y-coordinates of the group of run lengths and, thus, forms a silhouette of the group. Accordingly, the top profile 126 includes the uppermost line 128 of the group. The top profile may also include Y-coordinates for one or more lines 130 below the uppermost line. Portions 134 of the profile that do not correspond to any run lengths shall be set to a predetermined base value. For the preferred method shown in FIG. 6, the base value is −1.

Referring again to FIG. 4B, the preferred method generates the top profile by first setting up a one dimensional X-array of Y-coordinate values as shown in step 68 and initializing all cells of the X-array to the predetermined base value. As stated above, the base value for the preferred method is −1. Thus, the base value is the default Y-coordinate value of the X-array. As shown in step 72, the group of run lengths are then traversed, from one side to the other, for top profile information for each X-coordinate. Specifically, top profile information is identified as the upper most Y-coordinate value at each of the X-coordinates of the group. If such top profile information is found for a particular X-coordinate, the top profile information is entered into the portion of the X-array that corresponds to the particular X-coordinate as shown in steps 74 and 76. For those X-coordinates where top profile information is not found, the portions of the X-array that corresponds to those X-coordinates are left with the predetermined base value. Also, as shown in step 78, the above steps for generating the top profile are repeated until the group has been completely traversed.

In an ideal case where all horizontal lines in the group have no horizontal overlap, then breaks in this top silhouette can be used to extract individual lines. However, in practice, several horizontal overlaps exist and, therefore, the portion of the top profile that corresponds to the uppermost line must be distinguished from the rest of the top profile. This is accomplished by the determining step described below.

Figure 7:
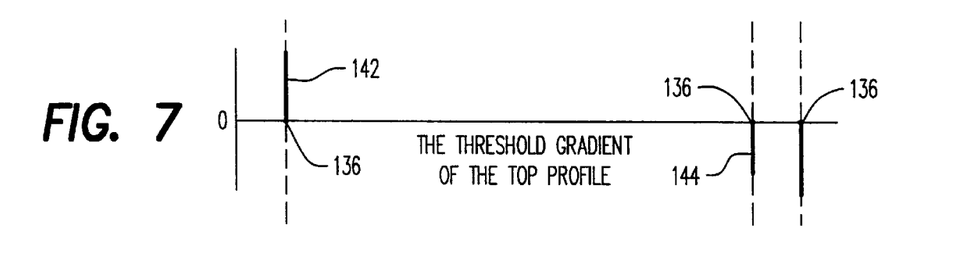
FIG. 7 is a graphic representation of a thresholded gradient of the top profile of FIG. 6.
Figure 8:
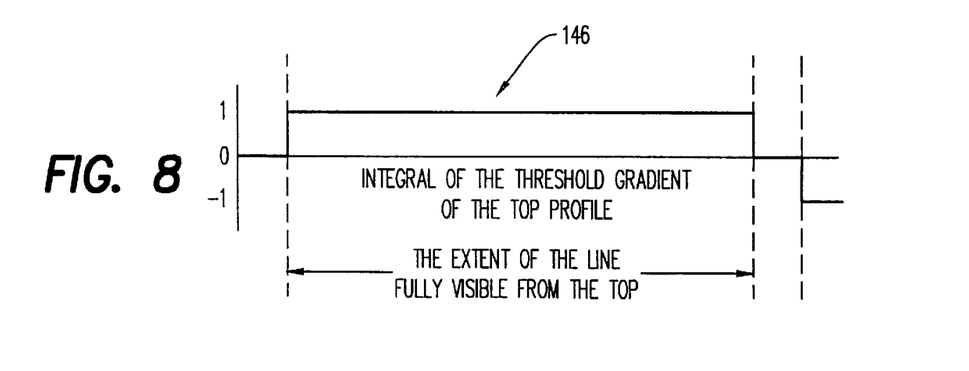
FIG. 8 is a graphic representation of an integral of the thresholded gradient of FIG. 7.

Referring to FIGS. 6, 7 and 8, the preferred method identifies the uppermost line 128 by finding X-coordinate points 136 along the top profile 126 where a change in profile position between coordinate points exceeds a predetermined threshold value. These X-coordinate points identify the ends 138 of the uppermost line 128 since they correspond to breaks 132 of the top profile 126. Of course, as shown in FIGS. 6 and 7, other lower lines 130 underneath the uppermost line 128 may produce one or more additional points that identify an end 140 of these lower lines. Thus, the derivative at these X-coordinate points 136 are analyzed in order to determine which points correspond to the ends of the uppermost line 128. In particular, while traversing the top profile 126 from one end to the other, the upward threshold gradient 142 and the downward threshold gradient 144 on either side of the uppermost string of continuous Y-coordinate values corresponds to the ends 138 of the uppermost line 128. The integral 146 of the thresholded gradient is then computed to determine the extent of the uppermost line 128.

Figure 4C:
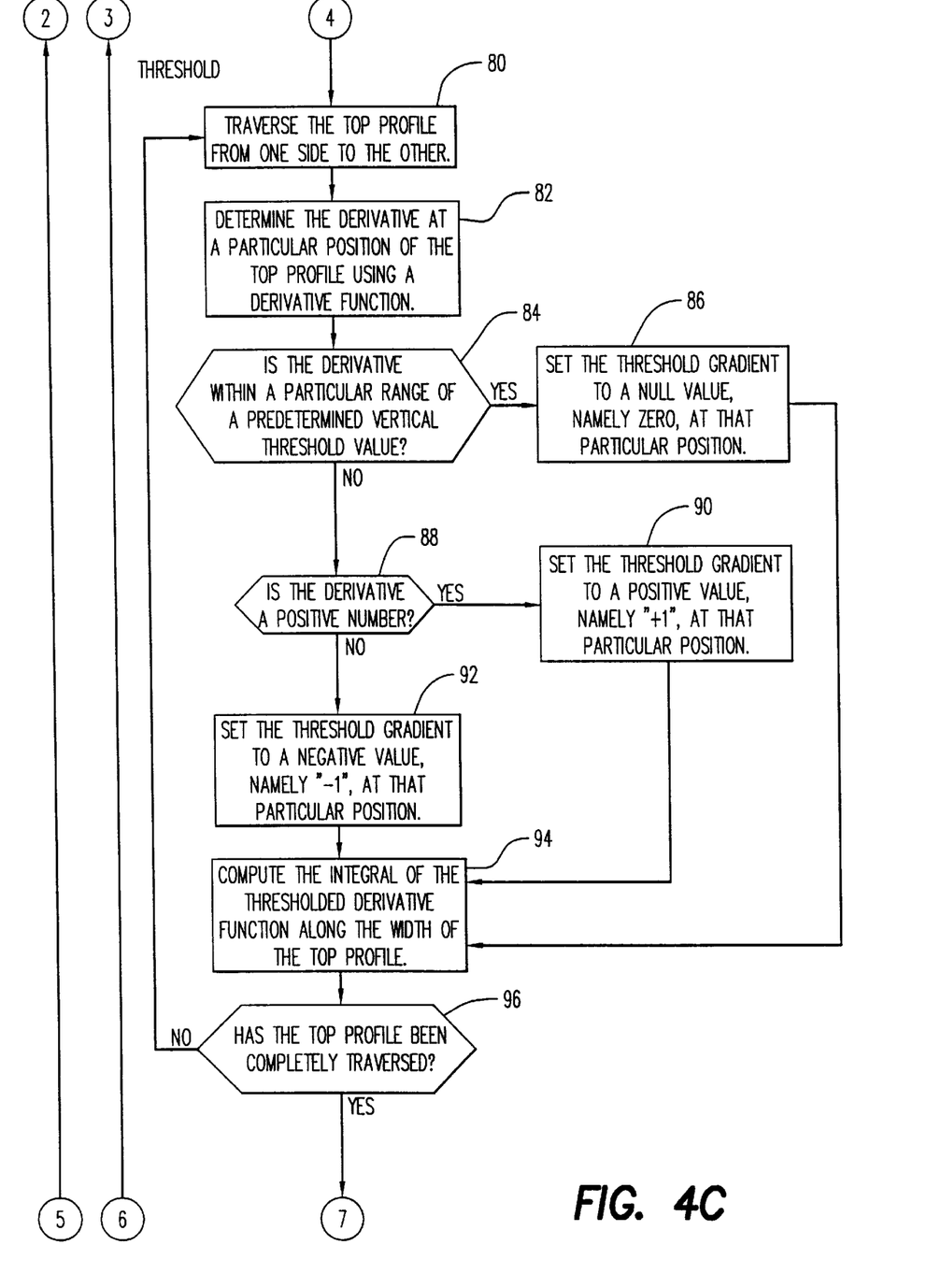

Referring to FIG. 4C, the preferred method identifies the uppermost line by traversing the top profile from one side to the other as shown by step 80. The derivative at a particular position of the top profile is determined using a derivative function as shown by step 82. Next, as shown by step 84, the preferred method determines whether the derivative is within a particular range of a predetermined vertical threshold value. If the derivative is within the particular range, then the gradient at the particular position is not large enough to signify a change in profile position and, thus, the threshold gradient is set to a null value, such as zero, as shown in step 86. On the other hand, if the derivative is not within the particular range, then a positive derivative will set the threshold gradient to a positive number, such as +1, and a negative derivative will set the threshold gradient to a negative number, such as −1, as shown in steps 88, 90 and 92. Thereafter, the integral of the derivative function along the width of the top profile is computed as shown in step 94, and the determining step is repeated until the top profile has been completely traversed as shown in step 96.

Figure 4D:
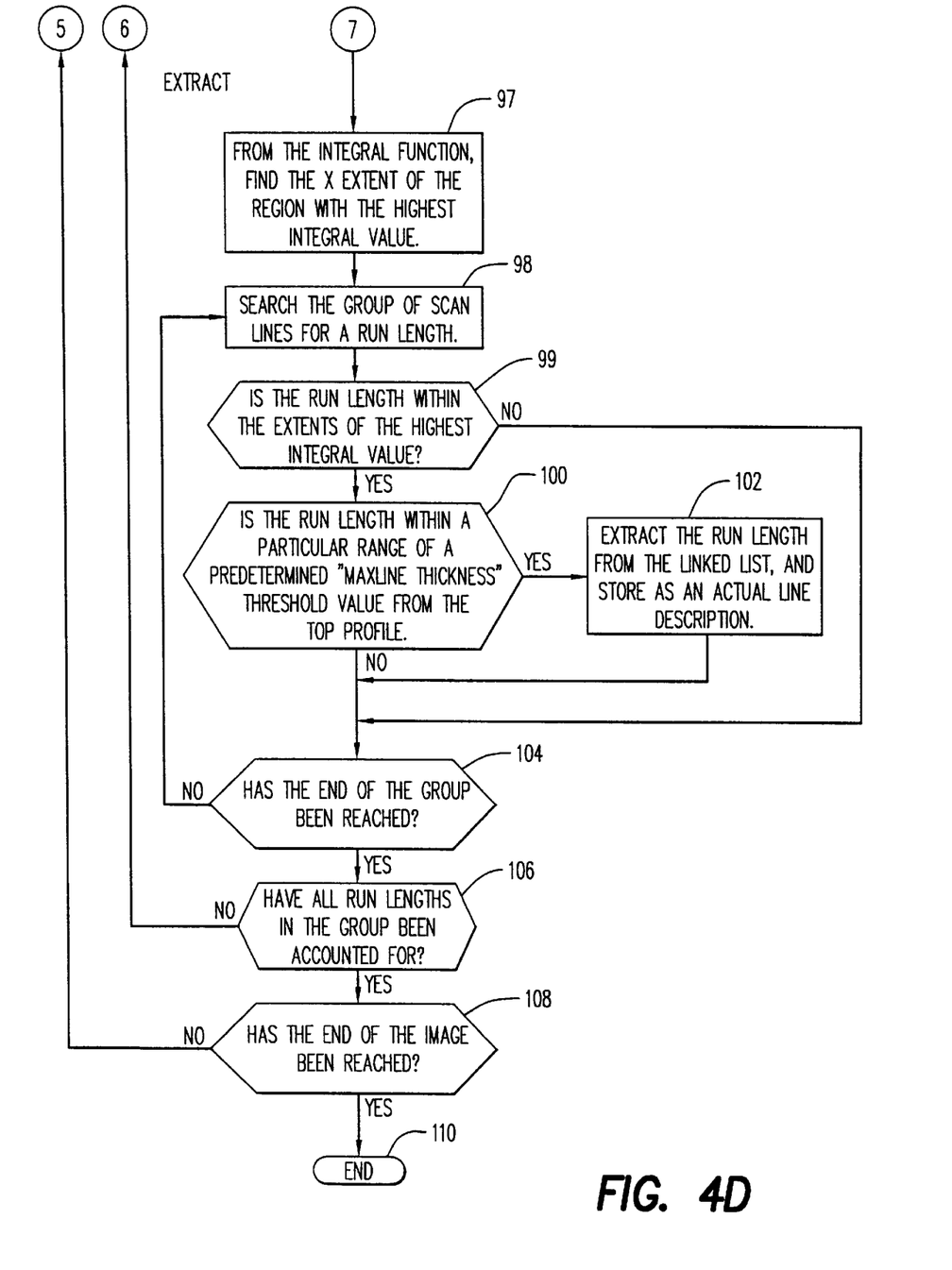

Referring to FIG. 4D, the uppermost line is extracted from the group. Specifically, the section of the top profile between the X-coordinate points that corresponds to the uppermost line's ends is extracted and stored as an actual line description. As shown in step 97, the x extent of the region with the highest integral value is found from the integral function. Next, in extracting the uppermost line, one must consider that multiple run lengths of the group may actually belong to a single line having a large thickness. To determine which run lengths may belong to such a thick line, the preferred method checks for run lengths that are within a particular range of a predetermined thickness value or "MaxLineThickness" threshold value from the top profile, as shown in step 100 as the group of scan lines for a run length are traversed as shown in step 98. In addition, the group of scan lines are searched until the run length with the extents of the highest integral value is identified as shown in step 99. Then, as shown in step 102, if a particular run length is within the particular range, the run length is extracted from the group and stored as an actual line description. These extracting steps are repeated until the end of the group is reached as shown in step 104.

Finally, the steps of generating the top profile, determining the points of the profile that identify the ends of the uppermost line, and extracting the uppermost run length are repeated until all run lengths of the group are processed, as shown in step 106. In addition, the steps of assembling a group of scan lines, generating the top profile, determining the points of the profile that identify the ends of the uppermost run length, and extracting the uppermost run length are repeated until all horizontal run lengths of the scanned image are processed, as shown in step 108, before the end of the preferred method at step 110. Further, as described above, the original scanned (unfiltered) image is then rotated 90° so that vertical lines of the image are oriented in a horizontal direction, and the all of the above steps are repeated in order to process all vertical run lengths of the scanned image.

It is to be understood that the preferred method, as described above, may be easily modified to detect differing line widths. In particular, while extracting one run length at a time from a group of run lengths, one could compute the bottom profile of the run lengths. The process for computing the bottom profile is identical to that of computing the top profile except that the one dimensional X-array of Y-coordinate values contains the lowermost Y-coordinate for each x value. Accordingly, the difference between the top and the bottom profiles could then be used as a measure of line width.

In summary, the present invention provides a fast and efficient method for detecting horizontal and vertical lines in run length encoded images. The preferred method drastically cuts down the memory storage requirement and computational effort required for locating lines by dealing with the run length encoded format of the image instead of converting the image to an unencoded or bitmapped format. In addition, the step of filtering extraneous information further reduces memory usage and computational efforts.

The invention having been thus described with particular reference to the preferred forms thereof, it will be obvious that various changes and modifications may be made therein without departing from the spirit and scope of the invention as defined in the appended claims.

What is claimed is:

1. A method for detecting one or more substantially linear line of a run length image, said method comprising the steps of:
   (a) generating a profile of said image in a coordinate system having a first axis with a plurality of first coordinates and a second axis with a plurality of second coordinates, said profile being a series of values that manifest maximum values of said second coordinates;
   (b) determining an uppermost line segment of said profile, by:
      (1) identifying one or more profile line segments by the steps of:
         (A) traversing said profile;
         (B) identifying an endpoint of a profile line segment where a change in a value of said second coordinates exceeds a predetermined threshold value;
         (C) repeating steps (b)(1)(A) and (b)(1)(B) until said profile has been completely traversed;
      (2) evaluating said values of said second coordinates of said one or more profile line segments to determine a profile line segment with a greater value than other said one or more profile line segments, identifying said profile line segment as said uppermost line segment;
   (c) extracting said uppermost line segment; and
   (d) extracting, along said second axis, run lengths located within a predetermined distance of said uppermost line segment.

2. The method of claim 1, further comprising filtering said image before said step of generating said profile, wherein said filtering step includes searching said image for gaps of less than a predetermined gap value between run lengths, and filling said gaps.

3. The method of claim 1, further comprising filtering said image before said step of generating said profile, wherein said filtering step includes searching said image for run lengths that are less than a predetermined run length value, and removing said run lengths.

4. The method of claim 1, further comprising grouping a portion of said image before said step of generating said profile, wherein said profile is generated from said portion.

5. The method of claim 1, wherein said generating step includes forming a one dimensional X-array for storing profile information that includes a Y-coordinate for each X-coordinate of said profile.

6. The method of claim 1, wherein said step (b)(1)(B), includes determining a derivative at a particular position of said profile.

7. The method of claim 6,
   wherein said derivative is a first value if said change in said value of said second coordinates of said profile does not exceed said predetermined threshold value;
   wherein said derivative is a second value that is greater than said first value if said change in said value of said second coordinates of said profile exceeds said predetermined threshold value, and is a positive change; and
   wherein said derivative is a third value that is less than said first value if said change in said value of said second coordinates of said profile exceeds said predetermined threshold value, and is a negative change.

8. The method of claim 7, wherein said first value is set to a null value, said second value is set to a positive value, and said third value is set to a negative value.

9. The method of claim 8, wherein said first value is set to 0, said second value is set to +1, and said third value is set to −1.

10. The method of claim 6, wherein step (b)(2), includes computing an integral of said derivative.

11. The method of claim 1, further comprising repeating steps (a) through (d) until all lines of said image are processed.

12. A method for detecting one or more horizontal line and one or more vertical line of a run length image for subsequent identification of one or more cell formed by said one or more horizontal line and said one or more vertical line, said one or more cell including content that may be processed by character recognition techniques, said image including a plurality of consecutive scan lines and a plurality of run lengths distributed throughout said scan lines, said method comprising the steps of:
   (a) grouping a portion of said image;
   (b) generating a profile of said image in a coordinate system having a first axis with a plurality of first coordinates and a second axis with a plurality of second coordinates, said profile being a series of values that manifest maximum values of said second coordinates;
   (c) determining an uppermost line segment of said profile by:
      (1) identifying one or more profile line segments by the steps of:
         (A) traversing said profile;
         (B) identifying an endpoint of a profile line segment where a change in a value of said second coordinates exceeds a predetermined threshold value;
         (C) repeating steps (c)(1)(A) and (c)(1)(B) until said profile has been completely traversed;
      (2) evaluating said values of said second coordinates of said one or more profile line segments to determine a profile line segment with a greater value than other said one or more profile line segments, identifying said profile line segment as said uppermost line segment;
   (d) extracting said uppermost line segment; and
   (e) extracting, along said second axis, run lengths located within a predetermined distance of said uppermost line segment.

13. The method of claim 12, further comprising filtering the image before the step of grouping said portion.

14. The method of claim 12, wherein said grouping step includes identifying a vertical gap in the image and grouping together run lengths that are positioned before said vertical gap.

15. The method of claim 14, wherein said first axis is an X-axis, said second axis is a Y-axis, and said step of identifying said vertical gap includes determining a present Y-coordinate value for a particular run length, determining a next Y-coordinate value for a subsequent run length, and determining whether the difference between said present Y-coordinate value and said next Y-coordinate value is greater than a predetermined vertical gap value.

16. The method of claim 12, further comprising filtering said image before step (b), wherein said filtering step includes searching said image for gaps of less than a predetermined gap value between run lengths and filling said gaps, and searching said image for run lengths that are less than a predetermined run length value and removing said run lengths.

17. The method of claim 12, wherein said first axis is an X-axis, said second axis is a Y-axis, and said step (b) includes forming a one dimensional X-array for storing profile information that includes a Y-coordinate for each X-coordinate of said profile.

18. The method of claim 12, wherein step (c)(1)(B) includes determining a derivative at a particular position of said profile.

19. The method of claim 18,
wherein said derivative is a first value if said change in said value of said second coordinates of said profile does not exceed said predetermined threshold value;
wherein said derivative is a second value that is greater than said first value if said change in said value of said second coordinates of said profile exceeds said predetermined threshold value, and is a positive change; and
said derivative is a third value that is less than said first value if said change in said value of said second coordinates of said profile exceeds said predetermined threshold value, and is a negative change.

20. The method of claim 18, wherein step (c)(2) includes computing an integral of said derivative.

21. The method of claim 12, further comprising step (f) processing all scan lines of said portion by repeating said steps (b) through (e) until all scan lines of said portion are processed.

22. The method of claim 21, further comprising step (g) processing the entire image by finding a next portion and repeating said step (f) until all portions of said image are processed.

23. A method for detecting one or more horizontal line and one or more vertical line of an encoded run length image for subsequent identification of one or more cell formed by said one or more horizontal line and said one or more vertical line, said one or more cell including content that may be processed by character recognition techniques, said image including a plurality of consecutive scan lines and a plurality of horizontal run lengths and vertical run lengths distributed throughout said scan lines, said method comprising the steps of:
(a) generating a horizontal profile of said image in a coordinate system having a first axis with a plurality of first coordinates and a second axis with a plurality of second coordinates, said horizontal profile being a series of values that manifest maximum values of said second coordinate;
(b) determining an uppermost horizontal line segment of said horizontal profile by:
(1) identifying one or more horizontal profile line segments by the steps of:
(A) traversing said horizontal profile;
(B) identifying an endpoint of a horizontal profile line segment where a change in a value of said second coordinates exceeds a predetermined threshold value;
(C) repeating steps (b)(1)(A) and (b)(1)(B) until said horizontal profile has been completely traversed;
(2) evaluating said values of said second coordinates of said one or more horizontal profile line segments to determine a horizontal profile line segment with a greater value than other said one or more horizontal profile line segments, identifying said horizontal profile line segment as said uppermost horizontal line segment;
(c) extracting said uppermost horizontal line segment;
(d) extracting, along said second axis, run lengths located within a predetermined distance of said uppermost horizontal line segment;
(e) repeating said steps (a) through (d) until all horizontal run lengths of image are processed;
(f) rotating said image by 90°, yielding a rotated image, so that vertical lines of said image are oriented in a horizontal direction;
(g) generating a horizontally-positioned vertical profile of said image in said coordinate system, said horizontally-positioned vertical profile being a series of values that manifest maximum values of said second coordinates;
(h) determining an uppermost horizontally-positioned vertical line segment of said horizontally-positioned vertical profile by:
(1) identifying one or more horizontally-positioned vertical profile line segments by the steps of:
(A) traversing said horizontally-positioned vertical profile;
(B) identifying an endpoint of a horizontally-positioned vertical profile line segment where a change in a value of said second coordinates exceeds a predetermined threshold value;
(C) repeating steps (h)(1)(A) and (h)(1)(B) until said horizontally-positioned vertical profile has been completely traversed;
(2) evaluating said values of said second coordinates of said one or more horizontally-positioned vertical profile line segments to determine a horizontally-positioned vertical profile line segment with a greater value than other said one or more horizontally-positioned vertical profile line segments, identifying said horizontally-positioned vertical profile line segment as said uppermost horizontally-positioned vertical line segment;
(i) extracting said uppermost horizontally-positioned vertical line segment;
(j) extracting, along said second axis, run lengths located within a predetermined distance of said uppermost horizontally-positioned vertical line segment;
(k) repeating steps (f) through (j) until all vertical run lengths of said image are processed.

24. The method of claim 23, further comprising:
(m) filtering said image before step (a);
(n) grouping a horizontal portion of said image before step (a);
(p) filtering said rotated image before step (g); and
(q) grouping a horizontally-positioned vertical portion of said rotated image before step (g)
wherein step (e) includes repeating step (n), and step (j) includes repeating step (g).

* * * * *

UNITED STATES PATENT AND TRADEMARK OFFICE
CERTIFICATE OF CORRECTION

PATENT NO. : 5,923,782

DATED : JULY 13, 1999

INVENTOR(S) : ATUL K. CHHABRA, VISHAL MISRA, SUREKHA SURYA

It is certified that error appears in the above-identified patent and that said Letters Patent is hereby corrected as shown below:

CLAIM 23, COL. 12, LINE 15, BEFORE "IMAGE" INSERT --SAID--.

CLAIM 24, COL. 12, LINE 61, AFTER "(G)" INSERT --,--.

CLAIM 24, COL. 12, LINE 62, DELETE "(J)" AND INSERT --(K)--.

CLAIM 24, COL. 12, LINE 63, DELETE "(G)" AND INSERT --(Q)--.

Signed and Sealed this

Twenty-fifth Day of April, 2000

Attest:

Q. TODD DICKINSON

*Attesting Officer*        *Director of Patents and Trademarks*